(12) United States Patent
Nakayama et al.

(10) Patent No.: US 7,259,352 B2
(45) Date of Patent: Aug. 21, 2007

(54) LASER WELDING METHOD AND LASER WELDING DEVICE

(75) Inventors: Shinichi Nakayama, Noda (JP); Takahiro Nagashima, Noda (JP)

(73) Assignee: Miyachi Technos Corporation, Chiba (JP)

( * ) Notice: Subject to any disclaimer, the term of this patent is extended or adjusted under 35 U.S.C. 154(b) by 0 days.

(21) Appl. No.: 10/548,999

(22) PCT Filed: Mar. 18, 2004

(86) PCT No.: PCT/JP2004/003636

§ 371 (c)(1),
(2), (4) Date: Sep. 14, 2005

(87) PCT Pub. No.: WO2004/082882

PCT Pub. Date: Sep. 30, 2004

(65) Prior Publication Data

US 2006/0201919 A1    Sep. 14, 2006

(30) Foreign Application Priority Data

Mar. 19, 2003  (JP) .............................. 2003-075004

(51) Int. Cl.
*B23K 26/20*    (2006.01)
*B23K 26/06*    (2006.01)
(52) U.S. Cl. .......................... 219/121.63; 219/121.64; 219/121.73
(58) Field of Classification Search ........... 219/121.63, 219/121.64, 121.73, 121.75
See application file for complete search history.

(56) References Cited

U.S. PATENT DOCUMENTS

| 4,564,736 | A | * | 1/1986 | Jones et al. | ............. 219/121.63 |
| 5,938,952 | A | * | 8/1999 | Lin et al. | ................ 219/121.64 |
| 6,990,136 | B2 | * | 1/2006 | Akiyama et al. | .............. 385/33 |
| 2003/0138203 | A1 | * | 7/2003 | Imakado et al. | ............... 385/33 |
| 2005/0121427 | A1 | * | 6/2005 | Mikata et al. | .......... 219/121.73 |

FOREIGN PATENT DOCUMENTS

| JP | 8-267264 | | 10/1996 |
| JP | 8-321651 | | 12/1996 |
| JP | 2000-321470 | | 11/2000 |
| JP | 2003-88984 A | * | 3/2003 |
| JP | 2003-285189 | | 10/2003 |

\* cited by examiner

*Primary Examiner*—Geoffrey S. Evans
(74) *Attorney, Agent, or Firm*—Koda & Androlia

(57) ABSTRACT

A laser welding process of the present invention comprises the steps of allowing a laser beam outputted from a laser beam generator to enter into an optical fiber through a light-introducing optical unit, and applying the laser beam exiting from the optical fiber to a weld zone through a light-delivering optical unit. The laser welding process is characterized in that the optical fiber has a core diameter set to be within 100 μm, a numeral aperture value for entrance of light into the optical fiber is set to be equal to or smaller than 0.05, a numeral aperture value for exiting of light from the optical fiber is set to be equal to or smaller than 0.1, and an energy of a one-pulse laser beam applied from the light-delivering optical unit is set at a value equal to or smaller than 1 joule.

4 Claims, 3 Drawing Sheets

(a)

(b)

LASER WELDING METHOD AND LASER WELDING DEVICE

FIELD OF THE INVENTION

The present invention relates to a laser welding process and a laser beam welding system, and more particularly, to a laser welding process and a laser beam welding system capable of the welding of a fine area.

BACKGROUND ART

In general, the laser welding has been employed in many cases for bonding of electronic parts and the like, because the thermal influence to peripheral portions of the part can be alleviated.

The present applicant has provided a solid laser device by which the processing of a work can be carried out under optimal processing conditions by conducting the waveform control higher in accuracy and rich in variety by realizing the fine or rapid pulse control, as disclosed in Patent Document 1, i.e., Japanese Patent Application Laid-open No. 8-321651.

Works to be welded by a laser welding process are beginning to be extended to micro parts with the development of the reduction in size of instruments and the micrometric reduction in size of parts, as represented by recent clocks, mobile phones, medical instruments and the like.

In many conventional pulse laser welding system, an output energy was set in a range of 5 to 100 joule (J)/pulse, and a laser pulse width was set in a range of 0.5 to 20 ms. If a stainless work is subjected to a fine laser spot welding by such a conventional laser welding system, the following disadvantage is encountered: a minimal welding nugget diameter is on the order of 100 µm (400 to 800 µm), and a maximal penetration depth is restricted to the order of 100 µm.

On the other hand, a welding quality desired with the reduction in size of current parts is such that a welding nugget diameter is equal to or smaller than 100 µm, and a penetration depth is at least equal to or larger than 200 µm, i.e., the same degree as that in the prior art from the relationship to a plate thickness and a welding strength.

DISCLOSURE OF THE INVENTION

The present invention has been accomplished with these points in view, and it is an object of the present invention to provide a laser welding process and a laser welding system, wherein the welding of a fine area can be achieved, for example, with a welding nugget diameter equal to or smaller than 100 µm and a penetration depth equal to or larger than 200 µm, and a reduction in size of the system can be achieved.

To achieve the above object, according to the present invention, there is provided a laser welding process comprising the steps of allowing a laser beam outputted from a laser generating means to enter into an optical fiber through a light-introducing optical unit, and applying the laser beam exiting from the optical fiber to a weld zone through a light-delivering optical unit, characterized in that the optical fiber has a core diameter set to be within 100 µm; an NA value for entrance of light into the optical fiber is set to be equal to or smaller than 0.05, an NA value for exiting of light from the optical fiber is set to be equal to or smaller than 0.1; and an energy of a one-pulse laser beam applied from the light-delivering optical unit is set at a value equal to or smaller than 1 joule (J).

Further, according to the present invention, there is provided a laser welding system comprising a laser beam generating means for outputting a laser beam, a light-introducing optical unit for permitting the laser beam from the laser beam generating means to enter into an optical fiber, the optical fiber for guiding the incident laser beam and having a core diameter set to be within 100 µm, a light-delivering optical unit for applying the laser beam exiting from the optical fiber to a weld zone, and a control unit for controlling an energy of the one-pulse laser beam applied from the light-delivering optical unit to a value equal to or smaller than 1 joule (J), an NA value for entrance of light into the optical fiber being set to be equal to or smaller than 0.05, and an NA value for exiting of light into the optical fiber being set to be equal to or smaller than 0.1.

In the laser welding process and the laser welding system, a ratio of a focal length of a collimating lens to a focal length of a light delivery lens in the light-delivering optical unit may be set at 4:1.

By operating the laser welding system according to the present invention by the laser welding process according to the present invention, it is possible to achieve the welding of a fine area with a welding nugget diameter equal to or smaller than 100 µm and with a penetration depth equal to or larger than 200 µm.

The laser welding process and the laser welding system according to the present invention are arranged and operated as described above and hence, it is possible to reliably carry out the welding of a fine area, for example, with a welding nugget diameter equal to or smaller than 100 µm and with a penetration depth equal to or larger than 200 µm. Further, since the NA values for entrance and exiting of light into and from the optical fiber are set to be small, each of the collimating lens and the light delivery lens of the light-delivering optical unit can be formed at a small size and in its turn, a reduction in size of the light-delivering optical unit can be achieved.

BEST MODE FOR CARRYING OUT THE INVENTION

An embodiment of the present invention will now be described.

Figure 1:
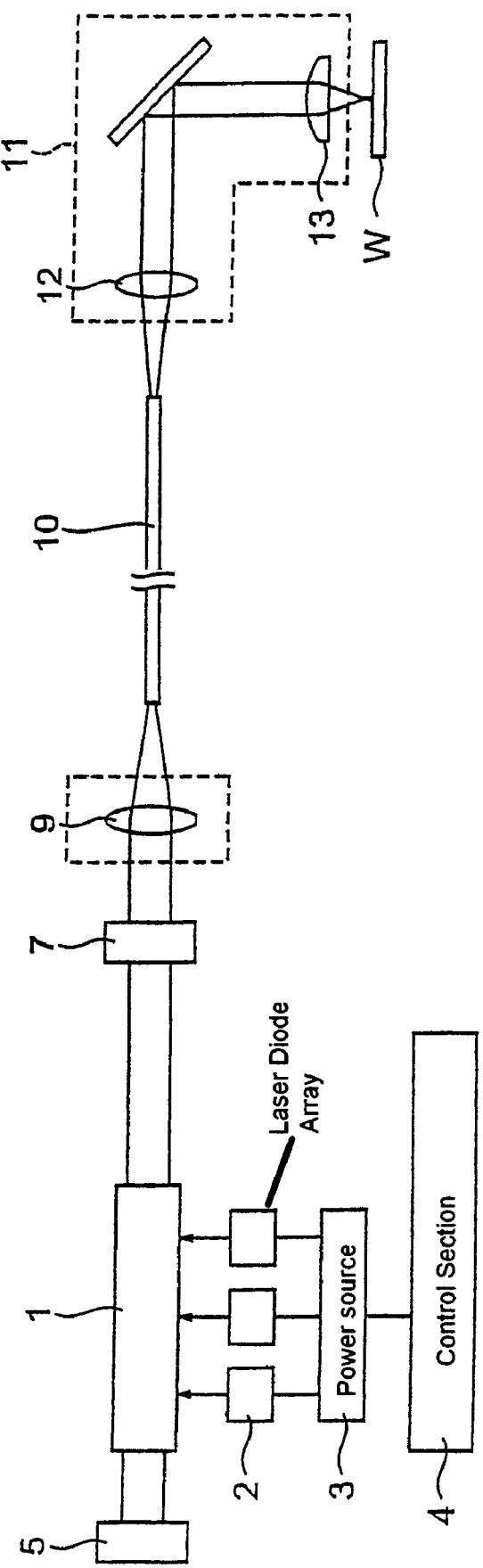
FIG. 1 is a diagrammatical illustration showing one embodiment of a laser welding system according to the present invention.

FIG. 1 shows one embodiment of a laser welding device of the present invention.

In the embodiment in FIG. 1, a laser beam is shown as being generated by the excitation of LD. More specifically, there are arranged a YAG rod 1 of a columnar shape which is one of laser media excellent in optical characteristics, and a semiconductor laser diode array 2 (which will be abbreviated to LDA 2 hereinafter) for optically pumping atoms of the YAG rod 1 by a side pumping manner to directly apply an excitation laser from sideways of the YAG rod 1. The LDA 2 is connected to a power source device 3, the supplying of electric power from which is controlled by a control section 4, so that the turning-on and turning-off of the LDA 2 can be rapidly switched from one to another. Even if the switching is conducted frequently, the life of the LDA 2 is little adversely affected. A fully reflecting mirror 5 for fully reflecting light is disposed in the vicinity of one end of the YAG rod 1 and at a predetermined distance from an end face of the YAG rod 1, and a semi-transmittable output mirror 7 adapted to permit the penetration of only a preselected solid laser beam is disposed in the vicinity of the other end of the YAG rod 1 at a predetermined distance from an end face of the YAG rod 1.

The laser beam generating means formed in this manner to output the laser beam is provided with a light-introducing optical unit 9 for permitting the outputted laser beam to enter into an optical fiber 10. Mounted on the light exit side of the optical fiber 10 is a light-delivering optical unit 11 for applying the laser beam exiting from the optical fiber 10 to a weld zone of a work W to be welded. The optical fiber 10 is formed so that the diameter of a core is set to be within 100 μm (at 100 μm in the present embodiment) for guiding the incident laser beam. This is because if the core diameter exceeds 100 μm, it is impossible to reduce the diameter of a light flux of the laser beam applied to the work W to be welded. An NA value for entrance of light into the optical fiber 10 from the light-introducing optical unit 9 is set to be equal to or less than 0.05, and an NA value for exiting of light from the optical fiber 10 toward the light-delivering optical unit 11 is set to be equal to or less than 0.1 (at 0.08 in the present embodiment).

Figure 2:
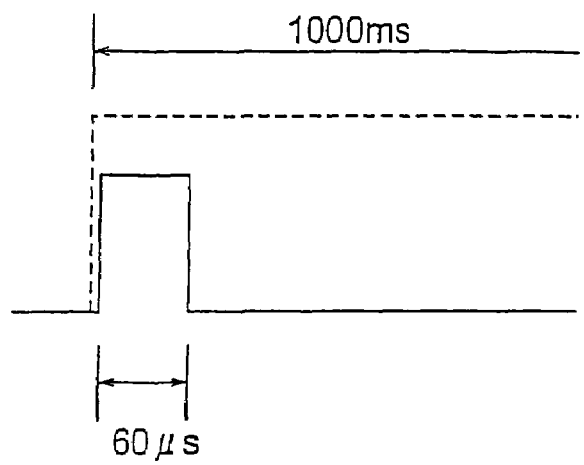
FIG. 2 is a diagram showing a one-pulse width provided by a process according to the present invention.

In the present embodiment, in order to realize the NA value as described above, a focal length of a condensing lens of the light-introducing optical unit 9 is set at 40 mm, and the NA value for entrance of light into the optical fiber 10 is set at 0.03. Further, the control section 4 is a control means for controlling the energy of a one-pulse laser beam applied from the light-delivering optical unit 11 to a value equal to or smaller than one joule (J). This is because if the energy of the one-pulse laser beam exceeds one joule (J), the diameter of a nugget formed on the work W to be welded is too large and hence, it is impossible to conduct the laser welding in a fine range. In the present embodiment, a pulse width of the one-pulse laser beam is set in a range of 60 to 100 μsec which is one tenth smaller than 1 msec of the conventional pulse width or less, as shown in FIG. 2.

Thus, the laser welding device according to the present embodiment is capable of carrying out the welding of a fine area with a welding nugget diameter equal to or smaller than 100 μm and with a penetration depth equal to or larger than 200.

The following is the description of a case where the laser welding is carried out according to a laser welding process of the present invention by operating the laser welding device of the present embodiment and bringing two thin plates of a stainless steel (having a thickness of 100 μm) as works W to be welded into a mutually butted relation.

In the laser welding device of the present embodiment, the control section 4 controls the turning-on and turning-off of the LDA 2 through the power source device 3 to excite the atoms of the YAG rod 1.

In the present embodiment, the turning-on and turning-off of the LDA 2 are controlled to regulate the energy of the one-pulse laser beam, so that the pulse width of the laser beam is in a range of 60 to 100 μsec (60 μsec in the present embodiment). This ensures that the energy of the one-pulse laser beam applied from the light-delivering optical unit 11 is equal to or smaller than one joule (J).

When the laser beam has been passed through the output mirror 7, its light flux is constricted in the light-introducing optical unit 9 disposed ahead of the output mirror 7 to set an NA value for entrance into the core having a diameter of 100 μm in the optical fiber 10 at 0.03. The laser beam propagated within the optical fiber 10 exits from an exit end face of the core with an exiting NA value of 0.08 toward a collimating lens 12 of the light-delivering optical unit 11. The laser beam is further constricted into a parallel laser beam in the collimating lens 12; then constricted at ¼ according to f1:f2=4:1 (f=200 mm and f2=50 mm in the present embodiment) in a light delivery lens 13; and applied toward the works W to be welded. It should be noted that the constriction rate may be changed to any value such as ⅓ or ⅕ to change the tip acuteness of the laser beam within a range enabling the welding in a fine area, depending on the nature of the work to be welded and the like.

It is preferable that the repetition rate (pps) per second of the laser beam having the pulse width of 60 μsec is adjusted to allow the appropriate laser welding for a work W to be welded, i.e., the welding of a fine area with a welding nugget diameter equal to or smaller than 100 μm and with a penetration depth equal to or larger than 200 μm.

Figure 4:
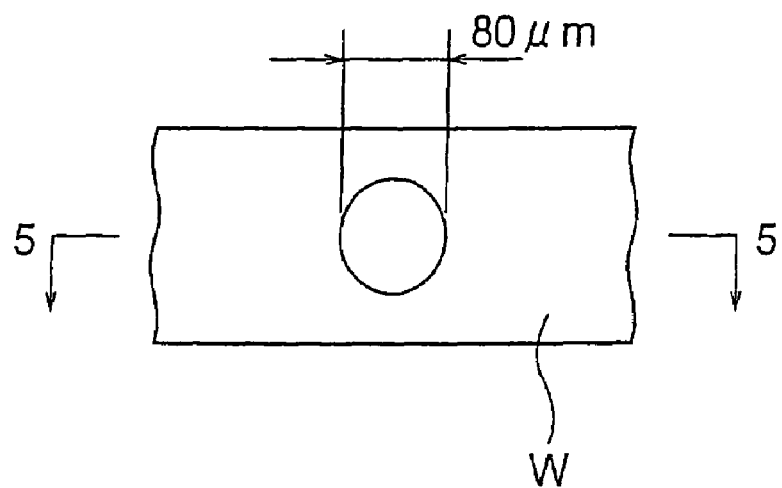
FIG. 4 is a view showing a surface of a work welded as shown in FIG. 3.
Figure 5:
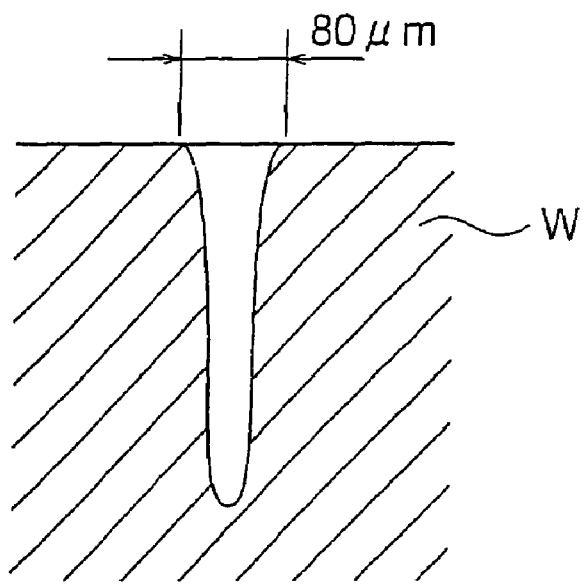
FIG. 5 is a sectional view taken along a line 5-5 in FIG. 4.

The situation of the laser welding will be further described with reference to FIGS. 3 to 5.

Figure 3:
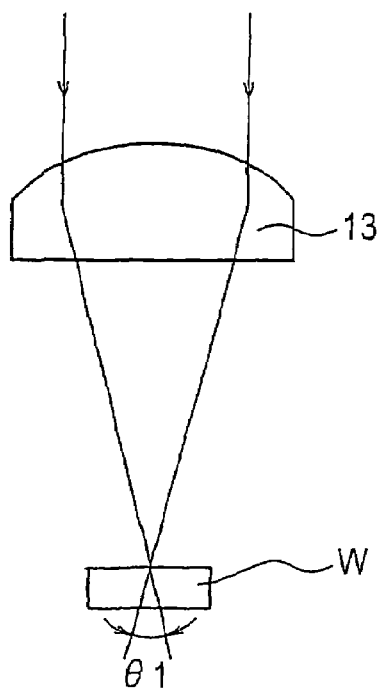
FIGS. 3a and 3b are a sectional view and a partially enlarged view showing a state of application of a laser beam in a welding state provided by the present invention.
Figure 3:
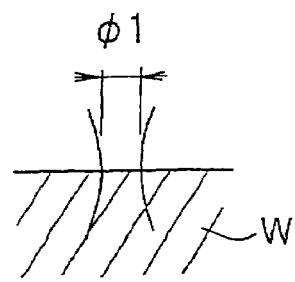

As shown in FIG. 3, the laser beam applied to the work W to be welded from the light delivery lens 13 of the light-delivering optical unit 11 is elongated because of a center angle θ1 decreased by the fact that the NA value for exiting of light from the optical fiber 10 is set to be equal to or smaller than 0.1. Therefore, for example, if the laser beam is applied to a single stainless plate having a thickness of 0.5 mm so as to be focused on a surface portion, as shown in FIG. 3*a*, the laser beam is applied so that the diameter φ1 of an optical path at a most constricted focus portion is 40 μm, as shown in an enlarged scale in FIG. 3*b*. Thus, the welding nugget diameter of the surface portion of the work W to be welded will be of about 100 μm, as shown in FIG. 4, and the penetration depth will be equal to or larger than 250 μm, as shown in FIG. 5.

In this manner, according to the present invention, the fine laser welding at only one point can be achieved. Therefore, it is possible to finely weld a lead frame to a fine welding for wiring, or to finely weld a fine mesh-shaped metal member disposed on a surface of a catheter which is one of medical instruments, or to weld a very fine gear and shaft for a clock to each other over the entire periphery.

The lens disposed within the light-delivering optical unit may be of a small size (the diameter of the lens used in the present embodiment is 30 mm) and hence, there is such an effect that the size of the light-delivering optical unit can be reduced.

It should be understood that the present invention is not limited to the above-described embodiment, and various modifications in design may be made as required.

For example, the above-described LDA 2 is of a so-called side pumping type disposed sideways of the YAG rod 1, but may be of an end pumping type disposed so that an exciting laser beam enters into the YAG rod 1 through its end face. Further, the excitation of the YAG rod 1 may be made by a lamp.

In addition, the solid laser medium is not limited to the YAG, and may be another medium such as a ruby, a glass and YLF and may be of a shape other than the columnar shape, such as a quadrilateral columnar shape, a slab shape and the like.

Further, any means such as a semiconductor laser generator and the like may be employed as the laser generating means.

What is claimed is:

1. A laser welding process comprising the steps of allowing a laser beam outputted from a laser beam generating means to enter into an optical fiber through a light-introducing optical unit, and applying the laser beam exiting from said optical fiber to a weld zone through a light-delivering optical unit, characterized in that said optical fiber has a core diameter set to be within 100 μm; a numeral aperture value for entrance of light into said optical fiber is set to be equal to or smaller than 0.05, a numeral aperture value for exiting of light from said optical fiber is set to be equal to or smaller than 0.1; and an energy of a one-pulse laser beam applied from said light-delivering optical unit is set at a value equal to or smaller than 1 joule (J).

2. A laser welding process comprising the steps of allowing a laser beam outputted from a laser beam generating means to enter into an optical fiber through a light-introducing optical unit, and applying the laser beam exiting from said optical fiber to a weld zone through a light-delivering optical unit, characterized in that said optical fiber has a core diameter set to be within 100 μm; a ratio of a focal length of a collimating lens to a focal length of a light delivery lens in said light-delivering optical unit is set at 4:1; and an energy of a one-pulse laser beam applied from said light-delivering optical unit is set at a value equal to or smaller than 1 joule (J).

3. A laser welding system comprising a laser beam generating means for outputting a laser beam, a light-introducing optical unit for permitting the laser beam from said laser beam generating means to enter into an optical fiber, the optical fiber for guiding the incident laser beam and having a core diameter set to be within 100 μm, a light-delivering optical unit for applying the laser beam exiting from said optical fiber to a weld zone, and a control unit for controlling an energy of the one-pulse laser beam applied from said light-delivering optical unit to a value equal to or smaller than 1 joule (J), a numeral aperture value for entrance of light into said optical fiber being set to be equal to or smaller than 0.05, and a numeral aperture value for exiting of light into said optical fiber being set to be equal to or smaller than 0.1.

4. A laser welding system comprising a laser beam generating means for outputting a laser beam, a light-introducing optical unit for permitting the laser beam from said laser beam generating means to enter into an optical fiber, the optical fiber for guiding the incident laser beam and having a core diameter set to be within 100 μm, a light-delivering optical unit for applying the laser beam exiting from said optical fiber to a weld zone, and a control unit for controlling an energy of the one-pulse laser beam applied from said light-delivering optical unit to a value equal to or smaller than 1 joule (J), a ratio of a focal length of a collimating lens to a focal length of a light delivery lens in said light-delivering optical unit being set at 4:1.

* * * * *